US010672278B2

(12) United States Patent
DeLuca et al.

(10) Patent No.: US 10,672,278 B2
(45) Date of Patent: *Jun. 2, 2020

(54) UNMANNED AERIAL VEHICLE AD-HOC CLUSTERING AND COLLABORATION VIA SHARED INTENT AND OPERATOR DISCOVERY

(71) Applicant: INTERNATIONAL BUSINESS MACHINES CORPORATION, Armonk, NY (US)

(72) Inventors: Lisa Seacat DeLuca, Baltimore, MD (US); Clifford A. Pickover, Yorktown Heights, NY (US); Dana L. Price, Surf City, NC (US); Aaron J. Quirk, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 32 days.

This patent is subject to a terminal disclaimer.

(21) Appl. No.: 15/979,974

(22) Filed: May 15, 2018

(65) Prior Publication Data
US 2018/0268716 A1     Sep. 20, 2018

Related U.S. Application Data

(63) Continuation of application No. 15/223,406, filed on Jul. 29, 2016, now Pat. No. 10,013,884.

(51) Int. Cl.
*G08G 5/00* (2006.01)
*H04W 76/10* (2018.01)
(Continued)

(52) U.S. Cl.
CPC ......... *G08G 5/0008* (2013.01); *B64C 39/024* (2013.01); *G08G 5/0013* (2013.01);
(Continued)

(58) Field of Classification Search
CPC .. G08G 5/0008; G08G 5/0017; G08G 5/0013; G08G 5/0056; G08G 5/0069;
(Continued)

(56) References Cited

U.S. PATENT DOCUMENTS 7,451,023 B2    11/2008   Appleby et al.
8,543,255 B2    9/2013    Wood et al.
(Continued)

FOREIGN PATENT DOCUMENTS

| CN | 102393747 | 3/2012 |
|---|---|---|
| WO | 2007094802 | 8/2007 |
| WO | 2015102731 | 7/2015 |

OTHER PUBLICATIONS

Jin et al., "Cooperative Real-Time Task Allocation Among Groups of UAVS", Department of Electrical & Computer Engineering and Computer Science, University of Cincinnati, http://eecs.ceas.uc.edu/~aminai/papers/in_ccco02.pdf, 22 pages, 2004.
(Continued)

*Primary Examiner* — Brian P Sweeney
(74) *Attorney, Agent, or Firm* — William Hartwell; Andrew D. Wright; Roberts Calderon Safran & Cole, P.C.

(57) ABSTRACT

Systems and methods for establishing an ad-hoc collaboration between unmanned aerial vehicles (UAVs) are provided. A method includes: configuring intent data of a first UAV using a controller of the first UAV; configuring a collaboration plan for the first UAV and a second UAV based on a determination of a shared intent between the first UAV and the second UAV; executing the collaboration plan by flying the first UAV and gathering data using the first UAV based on the collaboration plan; and sharing the gathered data with an operator of the second UAV.

20 Claims, 3 Drawing Sheets

(51) Int. Cl.
  H04W 84/18    (2009.01)
  B64C 39/02    (2006.01)
  H04B 7/185    (2006.01)
  G08G 5/02     (2006.01)

(52) U.S. Cl.
  CPC ......... *G08G 5/0017* (2013.01); *G08G 5/0039* (2013.01); *G08G 5/0056* (2013.01); *G08G 5/0069* (2013.01); *H04B 7/18504* (2013.01); *H04W 76/10* (2018.02); *B64C 2201/027* (2013.01); *B64C 2201/108* (2013.01); *B64C 2201/141* (2013.01); *G08G 5/025* (2013.01); *H04B 7/185* (2013.01)

(58) Field of Classification Search
  CPC .. G08G 5/0039; G08G 5/025; H04B 7/18504; H04B 7/185; H04W 76/10; B64C 39/024; B64C 2201/027; B64C 2201/108; B64C 2201/141
  USPC ......................................................... 701/120
  See application file for complete search history.

(56) References Cited

U.S. PATENT DOCUMENTS

| | | | |
|---|---|---|---|
| 8,868,323 | B2 | 10/2014 | Lommel et al. |
| 2006/0121418 | A1 | 6/2006 | DeMarco et al. |
| 2014/0156109 | A1 | 6/2014 | Estkowski |
| 2014/0316614 | A1 | 10/2014 | Newman |
| 2015/0234387 | A1 | 8/2015 | Mullan et al. |
| 2017/0238270 | A1 | 8/2017 | Shen et al. |
| 2018/0033312 | A1 | 2/2018 | Deluca et al. |

OTHER PUBLICATIONS

Bertuccilli et al., "Real-time Multi-UAV Task Assignment in Dynamic and Uncertain Environments", Massachusetts Institute of Technology, http://acl.mit.edu/papers/GNC09_CBBA_LL_pdf, 16 pages, 2009.
Bekmezci et al., "Flying Ad-Hoc Networks (FANETs): A survey", Elsevier, http://www.researchgate.net/publication/253954782_Flying_Ad-Hoc_Networks_%28FANETs%29_A_survey, 17 pages, 2013.
Ayres, "Robotic Ants May Aid in Search and Rescue Missions", EnterpriseTech, http://www.enterprisetech.com/2013/05/23/robotic_ants_may_aid_in_search_and_rescue_missions, 3 Pages, 2013.
YouTube video, "Crowd-Sourced Sports Coverage—Computerphile", https://www.youtube.com/watch?v=5BHw-up-3CA, published on Oct. 29, 2014, 1 Page.
Genter, "Ad Hoc Teamwork for Leading a Flock", Dept. of Computer Science, University of Texas at Austin, http://aamas.csc.liv.ac.uk/Proceedings/aamas2013/docs/p1431.pdf, p. 1431 to 1432, 2013.
Baseca et al., "Communication Ad Hoc Protocol for Intelligent Video Sensing Using AR Drones", Mobile Ad-hoc and Sensor Networks (MSN), 2013 IEEE Ninth International Conference, Dec. 11-13, 2013, http://ieeexplore.ieee.org/stamp/stamp.jsp?tp=&arnumber=6726373, 2 pages.
Patibandla, "Development of Mobile Ad-Hoc Network for Collaborative Unmanned Aerial Vehicles", Virginia Commonwealth University, http://scholarscompass.vcu.edu/cgi/viewcontent.cgi?article=4154&context=etd, Aug. 2013, 76 pages.
Kumar, "Robots that fly . . . and cooperate", TED Talk, https://www.ted.com/talks/vijay_kumar_robots_that_fly_and_cooperate?language=en, filmed Feb. 2012, 8 pages.
Bahingoz, "Networking Models in Flying Ad-Hoc Networks (FANETs): Concepts and Challenges", http://rd.springer.com/article/10.1007%2Fs10846-013-9959-7, Journal of Intelligent & Robotic Systems, Apr. 2014, vol. 74, Issue 1, p. 513 to 527.
Bouachir et al., "A Mobility Model for UAV Ad hoc Network", https://hal-enac.archives-ouvertes.fr/hal-00998651/document, ICUAS 2014, International Conference on Unmanned Aircraft Systems, May 2014, Orlando, United States. p. 383 to 388.
Godwin et al., http://link.springer.com/chapter/10.1007/978-3-540-48271-0_9?no-access=true, "A Distributed System or Collaboration and Control of UAV Groups: Experiments and Analysis", vol. 588 of the series Lecture Notes in Economics and Mathematical Systems, 2007, 4 pages.
Bekmezci et al, "Flying Ad-Hoc Networks (FANETs): A survey", https://www.sciencedirect.com/science/article/pii/S1570870512002193, Ad Hoc Networks, vol. 11, Issue 3, May 2013, pp. 1254-1270, 17 pages.
"List of IBM Patents or Patent Applications Treated as Related," 1 page.
List of IBM Patents or Patent Applications Treated as Related, dated Apr. 17, 2020, 1 page.
Specification "Unmanned Aerial Vehicle Ad-Hoc Clustering and Collaboration Via Shared Intent and Operator Discovery" and Drawings in U.S. Appl. No. 16/202,155 filed Apr. 14, 2020, 37 pages.

UNMANNED AERIAL VEHICLE AD-HOC CLUSTERING AND COLLABORATION VIA SHARED INTENT AND OPERATOR DISCOVERY

BACKGROUND

The present invention generally relates to unmanned aerial vehicles and, more particularly, to ad-hoc clustering and collaboration among plural unmanned aerial vehicles.

An unmanned aerial vehicle (UAV), commonly known as a drone, is an aircraft without a human pilot aboard. Flight of the UAV is controlled either autonomously by onboard computers or by the remote control of a pilot on the ground or in another vehicle. UAVs are increasingly being used to assist operators in data intensive activities such as videography, surveying, traffic analysis, etc. Prices for UAV hardware are also decreasing, which puts these capabilities in the hands of individual users.

SUMMARY

In a first aspect of the invention, there is a method for establishing an ad-hoc collaboration between unmanned aerial vehicles (UAVs). The method includes: configuring intent data of a first UAV using a controller of the first UAV; configuring a collaboration plan for the first UAV and a second UAV based on a determination of a shared intent between the first UAV and the second UAV; executing the collaboration plan by flying the first UAV and gathering data using the first UAV based on the collaboration plan; and sharing the gathered data with an operator of the second UAV.

In another aspect of the invention, there is a system that includes an unmanned aerial vehicle (UAV) and a controller associated with the UAV. The UAV includes an on-board computer processor, an on-board computer memory, an on-board wireless communication system, an on-board power source, an on-board propulsion system, and at least one on-board sensor. The controller associated with the UAV includes a processor, a control module, a collaboration module, and input/output system, and a wireless communication system. The UAV is configured to: receive an intent message that is broadcast by another UAV; analyze the intent message to determine a shared intent between the UAV and the other UAV; and transmit a message to the controller indicating the determination of the shared intent between the UAV and the other UAV.

In another aspect of the invention, there is a computer program product for establishing an ad-hoc collaboration amongst unmanned aerial vehicles (UAVs). The computer program product includes a computer readable storage medium having program instructions embodied therewith. The program instructions are executable by a computing device to cause the computing device to: receive input of intent data defining a task category and a task topic for a first UAV; transmit the intent data to the first UAV; receive a message to establish a connection from a controller of a second UAV based on a determination of a shared intent between the first UAV and the second UAV; receive input for configuring a collaboration plan for the first UAV and the second UAV, wherein the collaboration plan defines respective tasks to be performed by the first UAV and the second UAV; and modify flight plan data of the first UAV based on the collaboration plan.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
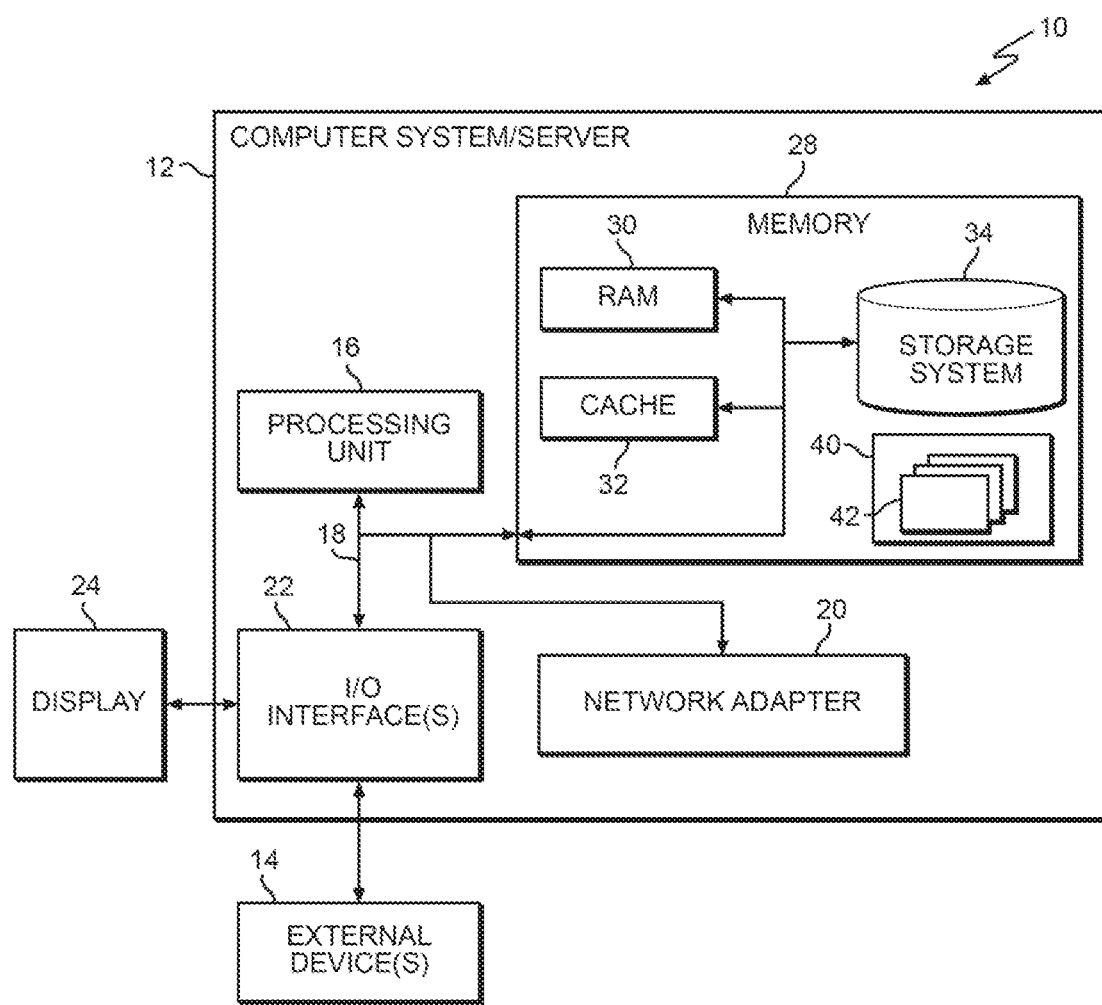
FIG. 1 depicts a computing infrastructure according to an embodiment of the present invention.

The present invention generally relates to unmanned aerial vehicles and, more particularly, to ad-hoc clustering and collaboration among plural unmanned aerial vehicles. Aspects of the invention are directed to ability for two or more UAVs to dynamically discover each other, advertise a task-oriented intent, connect unknown operators, and potentially pair in an ad-hoc collaboration towards a common goal. In embodiments, after a set of UAVs form an ad-hoc collaborative group, the division of work and the resultant data may be shared amongst operators according to the accepted terms of the group. In this manner, implementations of the invention provide a system and method for a UAV to cooperate with a previously unknown UAV to accomplish a common task, e.g., recording different views of a same event and subsequently sharing the recordings.

In an illustrative exemplary embodiment, plural UAVs that are independently recording an event within an area discover one another, and a collaboration agreement between the UAVs (or between the operators of the UAVs) is established to record different portions of the event and to share those recordings with each other. In embodiments, after an initial discovery process between the UAVs, the operators are connected via software on their control device or mobile application. At this point the operators can negotiate a collaboration agreement to which the UAVs will adhere. This may include division of work, coverage boundaries (e.g., specific regions within the area or specific angles at which subjects participating in the event may be recorded), and data sharing, which enable the task to be completed more effectively. One or more UAVs may be dynamically added/removed from the collaboration as UAVs enter/exit the area or otherwise indicate a desire to participate in the collaboration. In aspects, the UAVs are permitted to record their agreed-upon portions in any way that they (the UAVs) or their operators see fit, and are not assigned specific tasks or instructions outside of their agreed-upon portions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
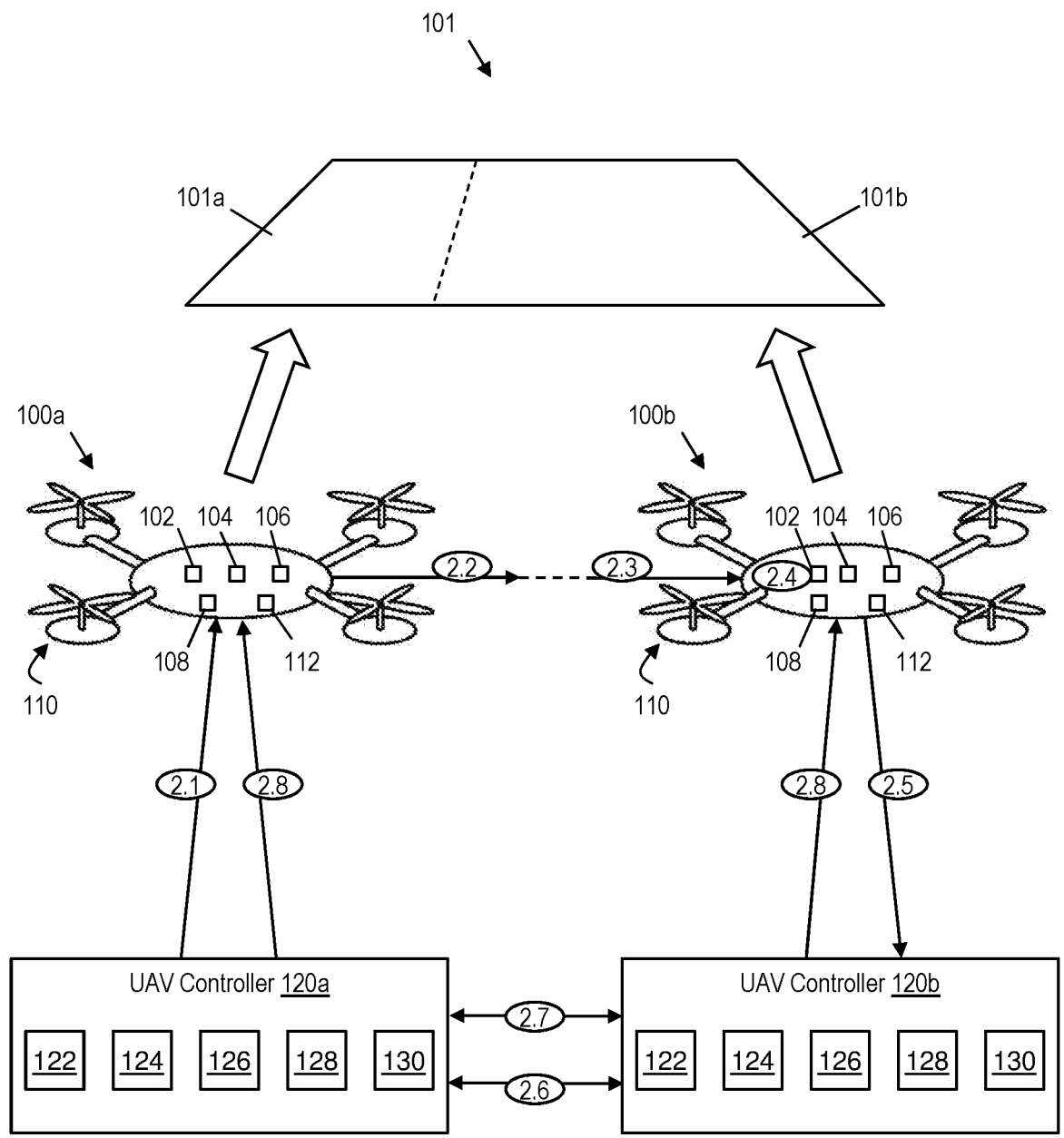
FIG. 2 shows a block diagram of an exemplary environment in accordance with aspects of the invention.

FIG. 2 shows a block diagram of an exemplary environment in accordance with aspects of the invention. In embodiments, the environment includes a first UAV 100a and a second UAV 100b in the vicinity of an area 101. Each of the UAVs 100a, 100b may include a computer processor 102, computer memory 104, wireless communication system 106, power source 108, propulsion system 110, and at least one sensor 112. For each respective UAV 100a, 100b, the computer memory 104 and computer processor 102 may be configured to store and execute programming that controls flight of the UAV and data gathering via the data sensor(s). For each respective UAV, the wireless communication system 106 facilitates wireless communication between the UAV and an associated controller (e.g., between UAV 100a and controller 120a), as well as wireless communication between the UAV and another UAV (e.g., between UAV 100a and UAV 100b). The power source 108 is configured to provide power (e.g., electrical power) to the components of the UAV and may comprise, for example, a rechargeable battery. The propulsion system 110 is configured to provide a motive force and directional control to the UAV and may comprise, for example, one or more propellers. The at least one sensor 112 may comprise any suitable sensor(s) for capturing desired data, including but not limited to a video sensor (e.g., a camera) and/or an audio sensor (e.g., a microphone).

Still referring to the environment of FIG. 2, a first controller 120a is associated with the first UAV 100a, and a second controller 120b is associated with the second UAV 100b. Each respective controller 120a, 120b is configured to communicate with and provide control signals to its associated UAV 100a, 100b for the purpose of controlling UAV functions such a flight control and data gathering. Each respective controller 120a, 120b may comprise a computer system having one or more components similar to those described in the computer system 12 of FIG. 1. For example, each respective controller 120a, 120b may include a processor 122 that is similar to the processing unit 16 of FIG. 1, and a control module 124 and a collaboration module 126 that are similar to program modules 42 of FIG. 1. Additionally, each respective controller 120a, 120b may include an input/output (I/O) system 128 by which a user provides input and/or receives output. The I/O system 128 may comprise conventional components, including but not limited to any one or more of: display screen, touch screen, joystick, buttons, levers, knobs, switches, dials, etc. Further, each respective controller 120a, 120b may include a wireless communication system 130 configured to facilitate wireless communication between the controller and its associated UAV (e.g., between controller 120a and UAV 100a), as well as wireless communication between the controller and another controller (e.g., between controller 120*a* and controller 120*b*).

FIG. 2 also illustrates aspects of an exemplary implementation of the invention with reference to steps indicated by reference numbers 2.1, 2.2, . . . , 2.8. In the exemplary implementation, the first UAV 100*a* and the second UAV 100*b* are each in the vicinity of the area 101, which may be a sporting field such as a soccer field. In this example, a first operator is using the first controller 120*a* to control the first UAV 100*a* to capture first video data of a soccer game being played on the soccer field in the area 101, and a second operator is using the second controller 120*b* to control the second UAV 100*b* to capture second video data of the same soccer game being played on the soccer field in the area 101. Aspects of the invention provide a system and method for the first operator and the second operator to discover one another, collaborate on gathering different video data of the soccer game, and share their video data with one another. In this manner, using implementations of the invention, UAV operators who are unknown to one another can discover one another and agree to an ad-hoc collaboration arrangement to dynamically share data captured using their individual UAVs.

Although the exemplary implementation is described with respect to a soccer field, it is noted that the area 101 is not limited to a sporting field and instead can be any area where a UAV is used to gather data using the onboard sensor(s) 112. Other exemplary areas include, but are not limited to, roadways (e.g., where a UAV may be used to gather traffic data) and geographic areas (e.g., where a UAV may be used to gather scenic imagery). Moreover, the data that is gathered and shared by the UAVs is not limited to video data, and instead may be any desired type of data that can be gathered by onboard sensor(s) 112.

Still referring to FIG. 2, at step 2.1 the first operator configures flight plan data of the first UAV 100*a* using the first controller 120*a*. The flight plan data may include conventional items such as geographic coordinates of flight, flight altitude, and flight duration. In embodiments, the flight plan data also includes intent data that defines a task-oriented intent of the flight of the first UAV 100*a*. For example, the intent data may define a task category including a type of data being gathered, such as at least one of video data, audio data, and photography data. The intent data may define a task topic such as at least one of an event name, time, and venue name, e.g., soccer game at 3:00 PM at XYZ Field.

In embodiments, the flight plan data at step 2.1 is configured by the operator providing input via the I/O system 128 of the first controller 120*a*. At least some of the flight plan data (i.e., the intent data) is communicated from the first controller 120*a* to the first UAV 100*a* using wireless communication system 130 and wireless communication system 106. Data that is communicated to the first UAV 100*a* may be stored in the onboard memory 104.

In accordance with aspects of the invention, at step 2.2 the first UAV 100*a* advertises a task-oriented intent while executing the flight plan, e.g., while flying in the vicinity of the area 101 and gathering data using the sensor(s) 112. In embodiments, the advertising is performed by the first UAV 100*a* using the wireless communication system 106 to broadcast an intent message to other UAVs in the vicinity of the area 101. The broadcasting at step 2.2 may be performed using any suitable communication protocol, including but not limited to Bluetooth, WiFi, UDP (User Datagram Protocol), etc.

The intent message broadcast at step 2.2 includes the intent data that is input by the operator, e.g., task category and/or task topic. The intent message at step 2.2 may also include intent data that is automatically determined by processor 102 of the UAV without requiring operator input during or after step 2.1. The intent data may include at least one of: region coordinates; UAV capabilities; and operator information. The region coordinates may include, for example, global positioning system (GPS) coordinates of area 101 as determined by the UAV 100*a* and/or the controller 120*a*. The UAV capabilities may include at least one of: nature of the sensor(s) 112, e.g., sensor type (e.g., video, audio, etc.) and sensor resolution (e.g., video resolution); capacity of the power supply 108, e.g., time of battery life to power the UAV 120*a* and the sensor(s) 112; maximum UAV flying speed and/or altitude; and UAV safety features. The operator information may include at least one of: operator name; operator email address; operator social media identifier; and an endpoint identifier associated with the controller 120*a*.

In embodiments, the controller 120*a* is configured to permit the operator to selectively define which data to include in the intent message that is broadcast at step 2.2. For example, the controller 120*a* may present a user interface (UI) via the I/O system 128 by which the operator may selectively opt-in or opt-out of sharing certain information in the intent message. As one example, the operator may provide input via the UI to define that the operator information includes an email address and an endpoint identifier, but not an operator name. As another example, the operator may provide input via the UI to define that the intent data includes sensor type but not sensor resolution. In this manner, the operator is provided the ability to define precisely which information will be shared with another UAV operator, and the operator can decide to share as much or as little information as they see fit. These examples are not limiting, and the operator may define any desired configuration of intent data to broadcast.

At step 2.3, the second UAV 100*b* receives the intent message that was broadcast by the first UAV 100*a* at step 2.2. The receiving may be performed by the wireless communication system 106 of the second UAV 100*b*.

At step 2.4, the second UAV 100*b* parses and analyzes the data included in the intent message that was received from the first UAV 100*a*. According to aspects of the invention, the operator of the second UAV 100*b* defines a flight plan for the second UAV 100*b* in a manner to that described with respect to step 2.1. In this manner, the second UAV 100*b* may have its own intent data stored in its onboard memory 104 prior to step 2.4. In embodiments, step 2.4 may include the processor 102 of the second UAV 100*b* comparing the intent data of the first UAV 100*a* (received at step 2.3) to the stored intent data of the second UAV 100*b*.

The comparing at step 2.4 may include at least one of: comparing the task category of the first intent data to the task category of the second intent data; comparing the task topic of the first intent data to the task topic of the second intent data; comparing the region coordinates of the first intent data to the region coordinates of the second intent data; and comparing the UAV capabilities of the first intent data to the UAV capabilities of the second intent data. Logic may be programmed into software executed by the processor 102 for performing the comparing and determining when the comparing results in a match. For example, the processor may be programmed to determine a match when intent data associated with the first UAV exactly matches corresponding intent data associated with the second UAV, e.g., both have a task category of video, both have a task topic having the same event name, both have the same region coordinates, both have a same video resolution, etc. The processor 102 may also be programmed to determine a match when the intent data associated with the first UAV is sufficiently similar to corresponding intent data associated with the second UAV based on, for example: number of same words or synonyms in the task topics; similar region coordinates as defined by having overlapping coordinates or coordinates within a predefined distance of one another; similar task category (e.g., photography may be defined as sufficiently similar to video); and meeting or exceeding a minimum video resolution.

In accordance with aspects of the invention, step 2.4 also includes determining whether the determined match (or matches) of the first intent data and the second intent data satisfy one or more threshold criteria. The threshold criteria may be predefined by the operator of the second UAV 100*b* and may be based on any one or more of the categories of data. In one example, the threshold criteria may be defined as requiring a match in each of task category, task topic, and region coordinates. In another example, the threshold criteria may be defined as requiring a match in each of task topic and minimum video resolution. These examples are not limiting, and the threshold criteria may be defined based on any desired combination of matches between the first intent data and the second intent data.

Still referring to step 2.4, in the event that the comparing the first intent data and the second intent data does not satisfy the threshold criteria, the second UAV 100*b* does not notify the second operator of the first UAV 100*a* and the process ends. In this manner, the threshold criteria serve as a mechanism for the second UAV 100*b* to filter (e.g., prevent) unwanted collaboration with a first UAV 100*a* that does not satisfy minimum requirements as defined by the operator of the second UAV 100*b*.

On the other hand, when the comparing the first intent data and the second intent data at step 2.4 does satisfy the threshold criteria, then at step 2.5 the second UAV 100*b* notifies the second operator of the similar intent. In embodiments, at step 2.5 the wireless communication system 106 of the second UAV 100*b* transmits a message to the second controller 120*b*. The message may include the first intent data (received from the first UAV 100*a* at step 2.3) and an indication of meeting the threshold criteria. In embodiments, upon receiving the message at step 2.5, the second controller 120*b* displays data to the second operator via the I/O system 128 of the second controller 120*b*, the displayed data including the first intent data and an indication of meeting the threshold criteria. The displayed data may also include an indication of which portions of the intent data are determined as matching. For example, step 2.5 may include the second controller 120*b* displaying at least one of the following of the first intent data: task category, task topic, region coordinates, UAV capabilities, and operator information (including available metadata about the first operator).

At step 2.6, the second controller 120*b* sends a message to the first controller 120*a* to establish a shared intent connection between the controllers. In embodiments, the collaboration module 126 of the second controller 120*b* causes the wireless communication system 130 of the second controller 120*b* to send a message to the wireless communication system 130 of the first controller 120*a*, e.g., using the endpoint identifier of the first controller 120*a* included in the first intent data. The message may be sent via any suitable protocol, e.g., WiFi, Bluetooth, TCP/IP, etc. The message may include an endpoint identifier for the second controller 120*b* so that the first controller 120*a* may send messages to the second controller 120*b*. The message may also include an indication of the shared intent and the second intent data associated with the second controller 120*b*. In this manner, each operator is made aware of the intent data of the other UAV.

With continued reference to step 2.6, upon establishing a connection between the controllers 120*a* and 120*b*, either operator may send a collaboration request to the other operator. Upon receiving a collaboration request from the requesting operator, the receiving operator may accept the request or reject the request. The sending the request and the accepting/rejecting the request may be facilitated by the collaboration module 126 of each respective controller 120*a* and 120*b*, e.g., by causing the I/O system 128 of each respective controller 120*a* and 120*b* to display a UI via which each respective operator can provide input to send a request and accept/reject a request.

In embodiments, when a collaboration request is received at a controller (e.g., at the second controller 120*b*), the collaboration module 126 is configured to determine and display at least one metric to assist the operator receiving the request in making a determination whether to accept or reject the request. The at least one metric may include a number of common social media contacts, e.g., a number of social media friends in common between the first operator and the second operator, a number of social media connections in common between the first operator and the second operator, etc. The at least one metric may include comments about the requesting user provided by other users that have previously collaborated with the requesting user. The collaboration module 126 is configured to determine the displayed metric(s) by analyzing publicly available data based on the operator information (e.g., name, social media identifier, etc.) provided by the requesting user.

Still referring to step 2.6, the process ends if the collaboration request is rejected by the operator that receives the collaboration request. In this manner, although a shared intent has been identified, the receiving operator may opt to avoid collaborating with the requesting operator. On the other hand, when the collaboration request is accepted by the operator that receives the collaboration request, then at step 2.7 the requesting operator and the receiving operator negotiate a collaboration plan via communications between the controllers 120*a*, 120*b*.

The negotiation at step 2.7 may include communications between the operators via the controllers 120*a*, 120*b*. The negotiation may be used to define terms of a collaboration plan, where the terms include at least one of: boundaries of flight; speed; altitude; video resolution; and filters. For example, the operators may agree that the first UAV 100*a* will record data from a first subset 101*a* of the area 101, and that the second UAV 100*b* will record data from a second subset 101*b* of the area 101. In another example, the operators may agree that the first UAV 100*a* will record data in the area 101 while flying at a first altitude and/or a first speed, and that the second UAV 100*b* will record data in the area 101 while flying at a second altitude and/or a second speed. In yet another example, the operators may agree that the first UAV 100*a* will record data in the area 101 using a first video resolution and/or a first video filter, and that the second UAV 100*b* will record data in the area 101 using a second video resolution and/or a second video filter. The negotiated terms of the collaboration plan are not limited to these examples, and any desired term or combination of terms may be negotiated and defined in the collaboration plan.

The negotiation at step 2.7 may also be used to define how data will be shared after the collaboration. For example, the operators may agree to exchange their recorded data via at least one of: wireless communication directly between the first UAV 100*a* and the second UAV 100*b*; email; social media website; and data sharing website. The terms of terms of the collaboration plan regarding sharing data may include identifying information to facilitate the agreed upon method of data sharing, e.g., email addresses of the operators (for sharing data via email), social media identifiers of the operators (for sharing data via social media website), http address of the data sharing website (for sharing data via data sharing website).

The negotiation at step 2.7 may be manual, automated, or a combination of both. An example of a manual negotiation is where the operators use freeform text messages (input into and communicated between the controllers) to define terms of the collaboration plan. An example of an automated negotiation is where the collaboration module 126 automatically applies terms of a previous collaboration plan that was defined and agreed to by the same two operators. An example of a combined automated and manual negotiation is where the collaboration module 126 provides templates and a user interface (UI) by which the operators provide input to define terms of the collaboration plan.

According to aspects of the invention, after both operators agree to the collaboration plan at step 2.7, then at step 2.8 the operators execute their flight plans according to the collaboration plan. Step 2.8 may include the control module 124 of each respective controller 120*a*, 120*b* sending configuration data to its associated UAV 100*a*, 100*b*, where the configuration data is used to implement one or more terms of the collaboration plan. For example, the first controller 120*a* may send configuration data to the first UAV 100*a* that causes the first UAV 100*a* to collect data from area 101*a*, and the second controller 120*b* may send configuration data to the second UAV 100*b* that causes the second UAV 100*b* to collect data from area 101*b*.

In situations where a UAV is flying and collecting data autonomously (i.e., using flight plan data that is stored onboard the UAV, without manual input from the operator), then step 2.8 may include modifying the onboard flight plan data based on the terms of the collaboration plan. For example, prior to the collaboration plan, the flight plan data for the first UAV 100*a* might include all of area 101, and after the collaboration plan the flight plan data for the first UAV 100*a* may be modified to included only area 101*a*. Other flight plan parameters such as altitude, speed, video resolution, etc., may also be modified based on the collaboration plan.

In situations where the operator is manually controlling the flight and/or data gathering of the UAV, then step 2.8 may include providing an alert to the operator when the flight and/or data gathering of the UAV deviates from the terms of the collaboration plan. For example, the collaboration plan may define that the first UAV 100*a* will fly in and gather data from area 101*a*. However, the operator of the first UAV 100*a* may cause the first UAV 100*a* to fly out of area 101*a* and/or gather data from area 101*b*. In this situation, the collaboration module 126 is configured to cause the first controller 120*a* to generate an alert (e.g., an audible and/or visual alert) that indicates the deviation from the terms of the collaboration plan. Based on receiving the alert, the operator of the first UAV 100*a* may choose to control the first UAV 100*a* to come back into compliance with the terms of the collaboration plan (e.g., go back to gathering data from area 101*a*). Alternatively, the operator of the first UAV 100*a* may choose to ignore the alert and continue controlling the flight and/or data gathering of the first UAV 100*a* in a manner that deviates from the terms of the collaboration plan.

At any time during step 2.8, one of the operators may decide to leave the collaboration. For example, the first operator may provide an input to the first controller 120*a* indicating an intent to terminate the collaboration, and the first controller 120*a* then sends a message to the second controller 120*b* indicting that the collaboration has been terminated. The input may be provided by a UI that is generated by the collaboration module 126 of the controller. In another example, the first UAV 100*a* and first controller 120*a* may move out of communication range of the second UAV 100*b* and second controller 120*b*. The collaboration module 126 may be programmed such that the collaboration is deemed terminated based on a time out, e.g., when there is no communication between the first UAV 100*a* and the second UAV 100*b* and/or between the first controller 120*a* and the second controller 120*b* for a minimum, predefined amount of time. When the collaboration is terminated based on either operator input or a time out, the collaboration module 126 may cause the controller to display a message indicating that the collaboration has terminated, such that each operator can go back to flying their UAV in a manner that is not constrained by the collaboration plan.

Aspects of the invention have been described with respect to two UAVs. However, implementations of the invention may provide for collaboration between any desired number of UAVs, including more than two UAVs. Moreover, when a collaboration plan already exists between a first and second UAV, the techniques described herein may be used to discover when a third UAV comes within range of the first and second UAVs, and to add the third UAV to the existing collaboration plan (or negotiate a new three-way collaboration plan).

In embodiments, after gathering data according to the collaboration plan at step 2.8, the data is then shared in the manner defined in the collaboration plan. This may include, for example, each respective operator emailing their data (e.g., a video file) to the other operator, posting the data to an agreed upon website, etc.

As thus described with respect to FIG. 2, implementations of the invention provide a system and method for establishing an ad-hoc collaboration amongst independently operated UAVs. The UAVs are considered independently operated because the respective UAVs are not associated with one another and are not members of a group flight plan or objective prior to the collaboration described herein. The collaboration is considered ad-hoc because it is developed in real time using peer-to-peer communication between the UAVs and between the UAV controllers without using a centralized system.

In the event the UAVs are gathering video data according to a collaboration plan as described herein, an automatic single video might be desired by the UAV operators. In embodiments, additional technologies such as movement tracking and/or object tracking can be used to determine which video feed to utilize during a specific segment of the event.

Aspects of the invention may also be utilized to facilitate cooperation between private UAVs (operated by a private party) and public UAVs (operated by a public entity). Examples of this collaboration include UAVs related to search and rescue, emergency response (floods, fires, accidents, etc.), UAVs surveying drought areas (including crops), and law enforcement. This invention may foster such collaborations between the public and private sector. In this case, the various UAV notification and discovery protocols would span public and private sectors, and have various safeguards and security measures as needed. For instance, a UAV run by a public institution may have access to some information that the private individual will not have, and some imagery captured by a public UAV may need to be encrypted and not revealed to a public user; nevertheless, the UAVs may cooperate in a convenient matter to promote public safety, as disclosed in the steps of this invention. General users may be willing to allow a public institution to make use of their UAV in an opt-in fashion for a period of time while in flight, or the public UAV users may get a form of remuneration for such use. Thus, protocols may be established for UAVs to switch into a protected or encrypted mode as needed.

Aspects of the invention may be utilized to facilitate a cooperative landing method for multiple UAVs. For example, one UAV may establish an ad-hoc communication network for multiple UAVs. Relative distances and angles between each UAV and one or more suggested landing areas may then be considered to facilitate a cooperative landing method. Onboard sensor information can be shared. Such cooperative landing (even between public and private UAVs, as described above), may be useful for many applications including: surveillance, refueling/recharging, sharing of charge, capturing a sporting event, etc.

Different UAVs will typically have different capabilities such as: video resolution, battery capacity, speed, camera wavelength-sensitivity, audio sensitivity, drone safety features, and the like. In embodiments, these characteristics may be shared, in an opt-in fashion, so as to foster effective collaborations.

Aspects of the invention may be used to facilitate collaboration between UAVs and non-UAV devices such as various sensors, cameras, smartphone with a camera and/or microphone, tablet computer with a camera and/or microphone, laptop computer with a camera and/or microphone, cameras on vehicles, microphones on devices, etc. For example, a UAV may utilize discovery and collaboration aspects of the invention enlist the help of a smartphone (e.g., with consent and help from a human operator and in an opt-in fashion so as not to sacrifice privacy) in a sequence of steps similar to those disclosed for UAV-UAV interaction.

Human operators can negotiate a collaboration agreement as described herein. Implementations of the invention may also utilize artificial intelligence (AI) of the UAV itself to automatically perform some or all of the negotiating the collaboration agreement. The human operator user may initially give permission for this AI request and action.

Figure 3:
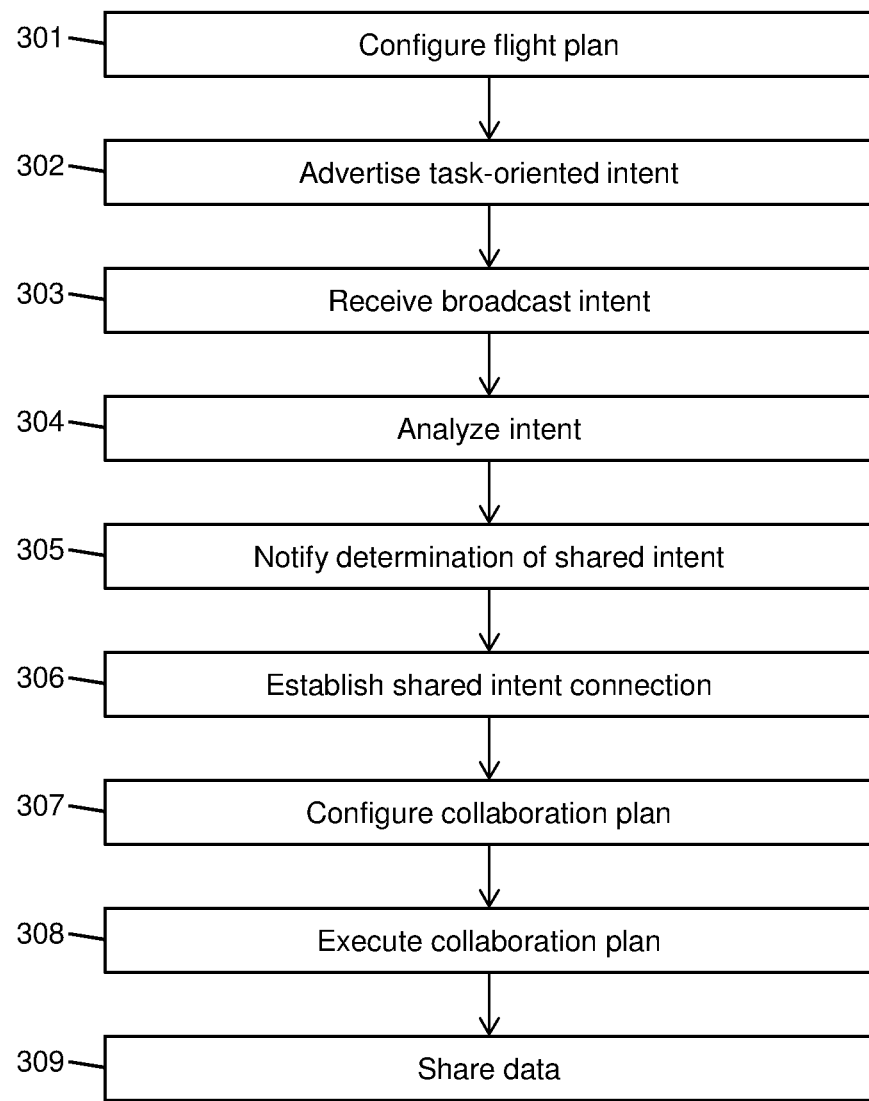
FIG. 3 shows a flowchart of a method in accordance with aspects of the invention.

FIG. 3 shows a flowchart of a method in accordance with aspects of the invention. Steps of the method of FIG. 3 may be performed in the environment illustrated in FIG. 2 and are described with reference to elements and steps shown in FIG. 2.

FIG. 3 depicts a method of establishing an ad-hoc collaboration amongst independently operated UAVs in accordance with aspects of the invention. At step 301, flight plans of UAVs are configured. This may be performed in the manner described with respect to step 2.1 of FIG. 2, e.g., by each respective operator providing input to a UAV controller, and each respective UAV controller transmitting flight plan data to its associated UAV. The flight plan data may include intent data as defined by the operator. The intent data may include at least one of a task category and a task topic.

At step 302, a first UAV advertises a task-oriented intent, e.g., by broadcasting an intent message as described in step 2.2 of FIG. 2. The intent message may include the intent data that is input by the operator and intent data that is automatically determined by the UAV.

At step 303, a second UAV receives the broadcast intent that was advertised in step 302. Step 303 may be performed in the manner described with respect to step 2.3 of FIG. 2.

At step 304, the second UAV analyzes the intent, e.g., in a manner described with respect to step 2.4 of FIG. 2. In embodiments, analyzing the intent includes comparing the first intent data (associated with the first UAV) to the second intent data (associated with the second UAV) and determining whether there are any matches in the compared intent data. The analyzing the intent further includes determining whether the determined matches, if any, satisfy one or more threshold criteria.

When it is determined at step 304 that the one or more threshold criteria are satisfied, then at step 305 the second UAV notifies the second UAV controller of the shared intent (i.e., the shared intent between the first UAV and the second UAV). Step 305 may be performed in a manner similar to step 2.5 of FIG. 2.

At step 306, a shared intent connection is established between the first UAV controller and the second UAV controller. Step 306 may also include one of the operators (the requesting operator) sending a collaboration request to the other operator (the receiving operator), and the receiving operator either accepting or rejecting the collaboration request. Step 306 may be performed in a manner similar to step 2.6 of FIG. 2.

When the receiving operator accepts the collaboration request at step 306, then at step 307 a collaboration plan is configured. Step 307 may be performed in a manner similar to step 2.7 of FIG. 2 and may include the operators negotiating collaboration plan terms such as: boundaries of flight, speed, altitude, video resolution, filters, and how to share data.

When the operators agree on and accept a collaboration plan at step 307, then at step 308 each UAV is controlled to execute the collaboration plan. Step 308 may be performed in a manner similar to step 2.8 of FIG. 2 and may include each respective UAV controller transmitting signals to its associated UAV to fly and gathering data using based on the collaboration plan.

At step 309, the data gathered at step 308 is shared between the operators. In embodiments, the data is shared in the manner defined by the terms of the collaboration plan. For example, the operators may share their data via email, posting to social media website, or posting to the data sharing website, e.g., in the manner described with respect to step 2.8 of FIG. 2.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for establishing an ad-hoc collaboration between unmanned aerial vehicles (UAVs), the computer program product comprising a computer readable storage medium having program instructions embodied therewith, the program instructions executable by a UAV controller to cause the controller to:
   configure intent data of a first UAV defining a task-oriented intent of a flight of the first UAV;
   configure a collaboration plan for the first UAV and a second UAV based on a determination of a shared intent between the first UAV and the second UAV;
   initiate flying of the first UAV based on the collaboration plan;
   gather data through the first UAV based on the collaboration plan; and
   initiate sharing of the gathered data with an operator of the second UAV.

2. The computer program product of claim 1, wherein the program instructions further cause the controller to initiate a broadcast of the intent data from the first UAV to the second UAV.

3. The computer program product of claim 1, wherein the collaboration plan defines respective tasks to be performed by the first UAV and the second UAV.

4. The computer program product of claim 1, wherein the program instructions further cause the controller to modify flight plan data of the first UAV based on the collaboration plan.

5. The computer program product of claim 4, wherein the modifying the flight plan data comprises modifying at least one selected from the group consisting of:
   flight area;
   flight altitude;
   flight speed; and
   sensor resolution.

6. The computer program product of claim 1, wherein the program instructions further cause the controller to generate an alert when the first UAV deviates from the collaboration plan.

7. The computer program product of claim 1, wherein the program instructions further cause the controller to display a message on a display of the controller based on the collaboration being terminated.

8. The computer program product of claim 1, wherein the sharing the gathered data comprises one of:
   transmitting the gathered data from the first UAV to the second UAV;
   emailing the gathered data to an email address defined in the collaboration plan;
   posting the gathered data to a social media site defined in the collaboration plan; and
   posting the gathered data to a data sharing website site defined in the collaboration plan.

9. The computer program product of claim 1, wherein the collaboration plan is configured based on different capabilities of the first UAV and the second UAV including at least one selected from the group consisting of:
   video resolution;
   battery capacity;
   speed;
   camera wavelength-sensitivity;
   audio sensitivity; and
   safety features.

10. The computer program product of claim 1, wherein the program instructions further cause the controller to add a non-UAV device to the collaboration, wherein the non-UAV device comprises one of a smartphone, tablet computer, and laptop computer.

11. An unmanned aerial vehicle (UAV) controller, comprising:
   a CPU, a computer readable memory and a computer readable storage medium associated with the UAV controller;
   a wireless communication system configured to communicate with a first UAV;
   program instructions to configure intent data of the first UAV defining a task-oriented intent of a flight of the first UAV;
   program instructions to configure a collaboration plan for the first UAV and a second UAV based on a determination of a shared intent between the first UAV and the second UAV;
   program instructions to initiate flying of the first UAV based on the collaboration plan;
   program instructions to gather data through the first UAV based on the collaboration plan; and
   program instructions to initiate sharing of the gathered data with an operator of the second UAV,
   wherein the program instructions are stored on the computer readable storage medium for execution by the CPU via the computer readable memory.

12. The UAV controller of claim 11, further comprising program instructions to initiate a broadcast of the intent data from the first UAV to the second UAV.

13. The UAV controller of claim 11, wherein the collaboration plan defines respective tasks to be performed by the first UAV and the second UAV.

14. The UAV controller of claim 11, further comprising program instructions to modify flight plan data of the first UAV based on the collaboration plan.

15. The UAV controller of claim 14, wherein the modifying the flight plan data comprises modifying at least one selected from the group consisting of:
   flight area;
   flight altitude;
   flight speed; and
   sensor resolution.

16. The UAV controller of claim 11, further comprising program instructions to generate an alert when the first UAV deviates from the collaboration plan.

17. The UAV controller of claim 11, further comprising program instructions to display a message on a display of the UAV controller based on the collaboration being terminated.

18. The UAV controller of claim 11, wherein the sharing the gathered data comprises one of:
- transmitting the gathered data from the first UAV to the second UAV;
- emailing the gathered data to an email address defined in the collaboration plan;
- posting the gathered data to a social media site defined in the collaboration plan; and
- posting the gathered data to a data sharing website site defined in the collaboration plan.

19. The UAV controller of claim 11, further comprising program instructions to add a non-UAV device to the collaboration, wherein the non-UAV device comprises one of a smartphone, tablet computer, and laptop computer.

20. A computer implemented method for establishing an ad-hoc collaboration amongst unmanned aerial vehicles (UAVs), the method comprising:

receiving, by a first controller associated with a first UAV, input of intent data defining a task category and a task topic for the first UAV;

transmitting, by the first controller, the intent data to the first UAV;

receiving, by the first controller, a message from a second controller of a second UAV to establish a connection based on a determination of a shared intent between the first UAV and the second UAV;

receiving, by the first controller, input for configuring a collaboration plan for the first UAV and the second UAV, wherein the collaboration plan defines respective tasks to be performed by the first UAV and the second UAV; and modifying, by the first controller, flight plan data of the first UAV based on the collaboration plan.

* * * * *